US012523328B2

(12) United States Patent
Ketterling et al.

(10) Patent No.: US 12,523,328 B2
(45) Date of Patent: Jan. 13, 2026

(54) VALVED COUPLING FOR DRIP IRRIGATION LINE

(71) Applicant: Kody J. Ketterling, Twin Falls, ID (US)

(72) Inventors: Kody J. Ketterling, Twin Falls, ID (US); Glen Grizzle, Murietta, CA (US)

( * ) Notice: Subject to any disclaimer, the term of this patent is extended or adjusted under 35 U.S.C. 154(b) by 42 days.

(21) Appl. No.: 18/634,845

(22) Filed: Apr. 12, 2024

(65) Prior Publication Data

US 2025/0320945 A1 Oct. 16, 2025

(51) Int. Cl.
*F16L 47/32* (2006.01)
*F16K 24/02* (2006.01)

(52) U.S. Cl.
CPC ............ *F16L 47/32* (2013.01); *F16K 24/02* (2013.01)

(58) Field of Classification Search
CPC ....... F16L 47/32; F16L 29/007; F16L 41/021; F16K 24/02; Y10T 137/7847; Y10T 137/7848; Y10T 137/7849; B05B 1/30; B05B 1/3006; B05B 1/3013; A01G 25/02
USPC ............... 251/152, 120, 121; 138/46
See application file for complete search history.

(56) References Cited

U.S. PATENT DOCUMENTS

| 812,451 A * | 2/1906 | Rice ....................... F16K 24/044 137/433 |
| 1,010,819 A * | 12/1911 | Thompson .............. A01G 29/00 405/39 |
| 3,719,327 A * | 3/1973 | McMahan ................ F16K 25/02 239/542 |
| 4,228,956 A * | 10/1980 | Varner ..................... B05B 1/323 239/533.1 |
| 4,722,481 A * | 2/1988 | Lemkin ................. A01G 25/023 137/513.5 |
| 9,821,335 B2 * | 11/2017 | Burrous .................. A01G 25/00 |
| 2009/0020634 A1 * | 1/2009 | Schweitzer .......... A01G 25/023 427/255.6 |
| 2012/0074345 A1 * | 3/2012 | Hatton ................... F16K 15/145 251/359 |
| 2012/0097254 A1 * | 4/2012 | Cohen ..................... A01G 25/02 137/67 |

OTHER PUBLICATIONS

Mister Landscaper 1/2—in Polypropylene Barb-locking Collar Drip Irrigation Elbow, retrieved from https://www.lowes.com/pd/Mister-Landscaper-1-2-in-Polypropylene-Drip-Irrigation-Elbow/1101657 on Jan. 21, 2025.

(Continued)

*Primary Examiner* — Jessica Cahill
(74) *Attorney, Agent, or Firm* — Burdick Patents, P.A.; Sean D. Burdick; Colin L. Honan (57) ABSTRACT

A valved coupling for use in a drip irrigation line includes a body having a top end and an open lower end. A main port is formed as part of the body. A cup engaged to the open lower end of the body forms the outlet. The body may be formed as a T-body have two ports or may be formed as an elbow body having only one port. A means for restricting the flow from the main port to the outlet is enclosed with the valved coupling. The flow restriction means includes a floating flow restrictor enclosed within a cavity formed by an insert contained within the cup and the body. As fluid flows into the cavity through the insert, the floating flow restrictor floats off the bottom surface of the cup thereby opening flow paths to the outlet.

19 Claims, 6 Drawing Sheets

(56) References Cited

OTHER PUBLICATIONS

Raindrip Black Plastic Drip Irrigation Tee Fitting for 1/2, 5/8, and 0.710 inch Tubing or Dripline, Twist-On Nut, Maximum 50 PSI, retrieved from https://www.lowes.com/pd/Raindrip-Universal-Polypropylene-Drip-Irrigation-Tee/3396548 on Jan. 21, 2025.

* cited by examiner

FIG. 6
SECTION A-A

FIG. 8
SECTION B-B

FIG. 10

FIG. 11
SECTION C-C

FIG. 12
SECTION C-C

FIG. 15
SECTION D-D

VALVED COUPLING FOR DRIP IRRIGATION LINE

BACKGROUND OF THE INVENTION

Field of the Invention

The invention disclosed herein relates generally to irrigation systems, and more specifically, to valved couplings designed for drip irrigation systems.

Description of Related Art

Drip irrigation systems are well known in the art as an alternative to conventional pop-up or rotary style sprinkling systems. Drip irrigation provides better precision and efficiency for water distribution in environments such as gardens and partially planted landscapes by targeting the water supply directly to the vegetation being watered. Drip irrigation releases water under relatively low pressure and at a low flow rate through drip heads or drip emitters located on the ground in close proximity to the targeted vegetation. Drip emitters are typically connected to a main irrigation line by one or more flexible hoses that can be easily routed around vegetation and landscaping to provide targeted watering. A solenoid valve, in electrical communication with an irrigation controller, is typically used to open and close the main irrigation line in response to commands received from the controller.

Known drip emitters have several different forms. For example, some drip emitters are rigid perforated terminals connected to the flexible feeder line, for example, by barbed hose connections, while others are simply regularly spaced holes formed directly in feeder line, which is also known as trickle hose.

Other emitter types can be designed as rigid screws or stakes that can be driven deep into the soil using a hammer or other such tools. These emitters deliver water deeper into the soil, encouraging plant roots to grow down into the soil, promoting stronger and healthier growth.

However, connectors or couplers for this type of emitter do not always provide the secure connection needed to properly direct a steady flow of water. The problem arises when the feeder line is inserted directly into an aperture at the top end of the rigid emitter and held in place by friction. As a result, drip lines may be easily uncoupled simply due to water pressure flowing through the line or from user manipulation of the line during routine maintenance or landscaping in the area around the emitter. Further, with the feeder line merely inserted into the rigid emitter, all emitters connected in line will either receive fluid from the source or none will receive the fluid. With current rigid emitter couplers or connectors, a user does not have the option to selectively shutoff one emitter without disrupting the fluid flow to an adjacent emitter downstream.

SUMMARY OF THE INVENTION

The invention disclosed herein relates to a specialized coupling that can be used to connect a drip line emitter to a drip irrigation feeder line. Particularly, a coupling according to the present disclosure incorporates a valve designed for use in relatively low pressure drip irrigation systems, to allow water flow to an individual emitter to be selectively turned on or shut off without affecting flow to other emitters installed in series along a common feeder line.

Accordingly, one embodiment of a valved coupling according to the present invention includes a body having an upper end and open lower end. A main port is formed with the body and serves as an inlet into the valved coupling. A cup is configured to engage the open lower end of the body and includes an outlet. A means for restricting flow from the main port to the outlet is enclosed within valved coupling. In some embodiments, the body is partially enclosed within the cup. Furthermore, a portion of the body may be welded to a portion of the cup to ensure a secured connection is maintained.

In some embodiments, the body may include a second port. Each of the main port and the second port may be designed as a barbed extension having a flow channel that opens into an internal cavity of the body. In further embodiments, an extension may be formed to extend from a bottom surface of the cup, the extension defining the outlet. Preferably, the extension has an outer diameter that is less than the outer diameter of the cup. In more preferred embodiments, the extension is configured to frictionally engage a receiving aperture formed in the drip emitter or drip head.

The flow restriction means preferably includes a floating flow restrictor, an insert enclosing the floating flow restrictor within the cup, and a set screw configured to contact an upper end of the insert. Preferably, the insert includes a hollow stem extending from a concave bowl, the bowl defining a cavity there beneath. A channel is defined through the hollow stem and opens into the cavity beneath the bowl. The floating flow restrictor is preferably freely floating in the cavity, beneath the concave bowl.

In some embodiments, the floating flow restrictor has a conical body with a top end, a bottom end, and an annular flange extending partially around the lower end. A notched portion is removed from the annular flange so that the flange extends less than 360-degrees around the lower end of the conical body. A notched channel is formed in the bottom surface of the lower end and is preferably aligned with the notched portion of the annular flange. When the flow restriction means is open, the notched channel fluidically connects the main port to the outlet.

In preferred embodiments, the floating flow restrictor is designed to float within the cavity below the concave bowl in response to fluid entering the cavity. As the floating flow restrictor floats in the cavity, additional flow paths are opened to the outlet.

In some embodiments, the set screw is adjustable between an open position and a closed position. When the set screw is in the open position, the set screw does not contact the hollow stem of the insert, and this allows the channel to conduct flow into the cavity there below. When the set screw is set to the closed position, the set screw contacts the hollow stem to close off or plug the channel, which stops fluid flow to the cavity.

In further embodiments, the cup may also include an annular ledge formed about an inner wall of the cup. The ledge is configured to engage the insert. In some preferred embodiments, the annular ledge is formed proximate the closed bottom surface of the cup. The body may also include a first step extending from the open lower end and a second step extending from the first step. The first step of the body is designed to frictionally engage an inner surface of the cup to secure the two component pieces together. In some embodiments, the insert may be secured in place between the ledge of the cup and the second step of the body. The insert may be said to be "pinch fit" between the ledge and the second step.

In some embodiments, the body may include a second port in fluid communication with the main port. An internal cavity defined within the body maintains the fluid communication between the main port and the second port. The fluid communication between the main port and the second port is maintained through the internal cavity regardless of whether the outlet is fluidically connected with the main port and the second port.

These and other features of the claimed invention will become apparent to the skilled artisan in view of the following disclosure.

BRIEF DESCRIPTION OF THE DRAWINGS

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. Component parts shown in the drawings are not necessarily to scale, and may be exaggerated to better illustrate the important features of the invention. Dimensions shown are exemplary only. In the drawings, like reference numerals may designate like parts throughout the different views, wherein:

DETAILED DESCRIPTION OF THE INVENTION

The following disclosure presents exemplary embodiments of a specialized coupling that can be used in a drip irrigation system to connect a common feeder line to multiple drip emitters or drip heads. Particularly, the invention disclosed herein relates to a valved coupling for a drip irrigation system. The valved coupling according to the present invention can reliably connect a drip head or drip emitter, such as a drip-screw, with a fluid source, such as the main irrigation line, and provide the operator the option to selectively deliver fluid to individual drip emitters. A user can select the desired flow to each individual drip sprinkler by adjusting the valved coupling deployed with that drip sprinkler, without such adjustment impacting the flow to the next drip head. The disclosed invention can therefore be particularly useful in irrigating gardens or flower beds where the different plant types may have different water requirements yet receive water from a common irrigation line.

Figure 1:
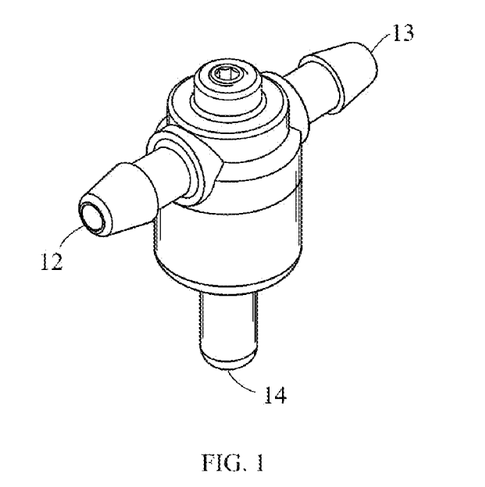
FIG. 1 is a perspective view of an embodiment of a valved coupling according to the present invention.

FIG. 1 is a perspective view of one embodiment of a valved coupling according to the present invention. The valved coupling 10 has at least one port 12 in selectable fluid communication with an outlet 14. In preferred embodiments, the outlet 14 is configured for press-fit engagement with a receiving aperture 102 formed on a drip head or drip emitter 100 (e.g., FIG. 16-17) deployed along the drip irrigation line, as explained in more detail below. In embodiments where the valved coupling 10 is configured as a T-coupling, there is a second port 13 formed opposite the first port 12. Note, one of the first port 12 or second port 13 will act as an outlet for fluid depending on the direction of the fluid source while the other of the first port 12 or second port 13 serves as an inlet to the valved coupling 10. Reference to both the first and second ports 12, 13 as an inlet or outlet is not meant to be limiting as either end 12 or 13 can act as the inlet when connected to the fluid source and the other end will act as a secondary outlet for the fluid.

Figure 2:
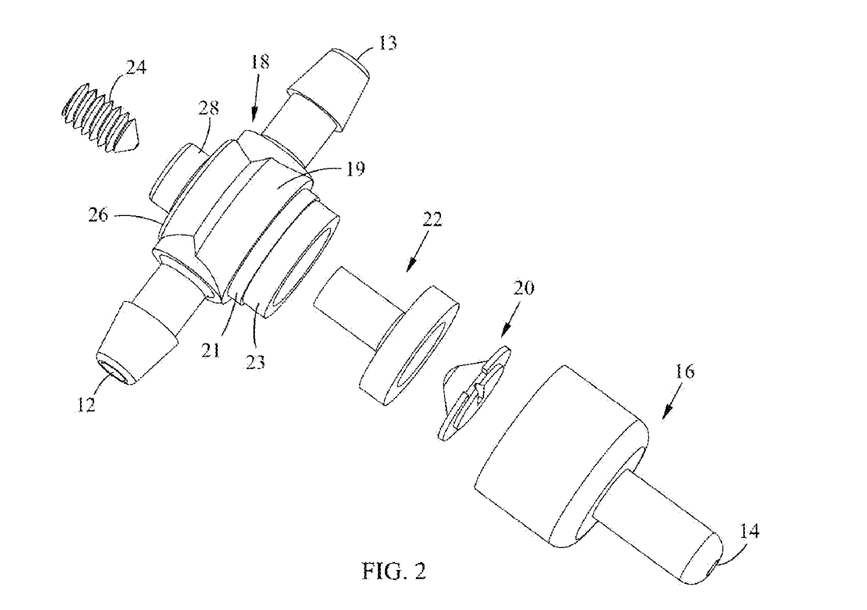
FIG. 2 is an exploded perspective view of the valved coupling of FIG. 1.

FIG. 2 is an exploded perspective view of the valved coupling 10. The valved coupling 10 includes a cup 16 engaged to a T-body 18. The cup 16 defines the outlet 14 whereas the T-body 18 defines the ports 12, 13. Contained within the valved coupling 10 is a means for restricting the flow of fluid from the port 12 and 13 to the outlet 14. The flow restriction means allows an operator to selectively shutoff the outlet 14 for an individual valved coupling 10 without disrupting fluid flow to other valved couplings 10 deployed along the same irrigation line. The operator can therefore customize the watering profile for a single feeder line by selecting which valved coupling 10 is open without affecting flow to any upstream or downstream drip emitters deployed on the same line. When the outlet 14 has been shutoff by an operator by adjusting the flow restriction means, the ports 12 and 13 remain in fluid communication with one another through the T-body 18 so that fluid delivered to that valved coupling 10 may still reach the next valved coupling 10 deployed along the drip irrigation line.

The flow restriction means preferably includes a floating flow restrictor 20, an insert 22 and a set screw 24. The set screw 24 extends through an upper surface 26 of the T-body 18. In some embodiments, the T-body 18 may have a screw housing 28 formed atop the upper surface 26. The screw housing 28 provides sufficient depth for the set screw 24 to maintain its threaded engagement in the T-body 18 while allowing for the necessary adjustment of the set screw to work against the insert 22.

In preferred embodiments, the T-body 18 has an open-ended main body 19 connected to the cup 16. The main body 19 fluidically connects the first port 12 and second port 13 through a cavity 64 defined therein. A first annular step 21 extends from the open end of the main body 19 and a second annular step 23 extends from the first step 21. The second annular step 23 is enclosed by the cup 16 when assembled. The second annular step 23 has an outer diameter less than the outer diameter than the first annular step 21. The first annular step 21 is configured for press-fit engagement with a portion of the cup 16 and may define the location for a welded joint for securing the T-body 18 to the cup 16. Preferably, the first annular step 23 is sonically welded to a portion of the cup 16 although other forms of welding may be used. Alternatively, an adhesive or other type of sealant may be used to secure the first annular step 23 to a portion of the cup 16. The second annular step 23 acts as a stopper against an edge of the insert 22 to hold the insert in place when the valved coupling 10 is assembled.

Figure 3:
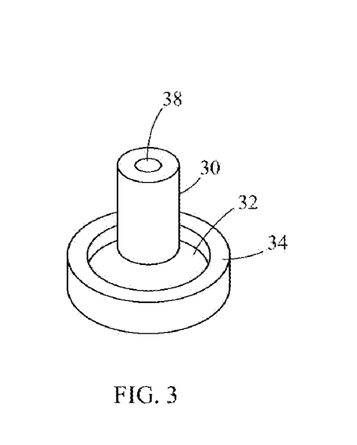
FIG. 3 is a side perspective view of an embodiment of an insert removed from the valved coupling of FIG. 2.
Figure 4:
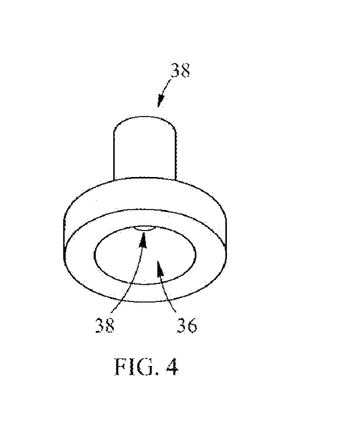
FIG. 4 is a bottom up perspective view of the insert of FIG. 3.

FIG. 3 is a perspective view of an embodiment of an insert 22 and FIG. 4 is a bottom-up perspective view of the same insert 22. The insert 22 has a hollow stem 30 extending from a bowl 32. The bottom surface 36 of the bowl 32 is preferably concave. When the insert 22 is enclosed within the cup 16, a cavity 66 is formed beneath the bottom surface 36 of the concave bowl 32 to house the flow restrictor 20. The concavity of the bottom surface 36 is engineered to substantially match the shape of the floating flow restrictor 20 so that the flow restrictor 20 can freely float thereunder, as explained in more detail below.

Figure 5:
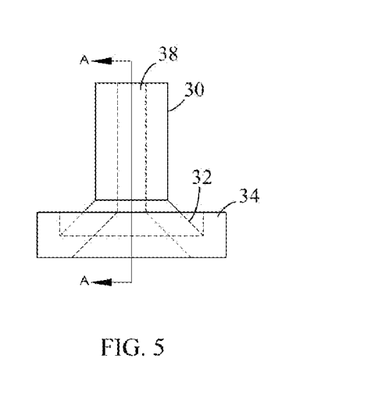
FIG. 5 is a side view of the insert of FIG. 3.
Figure 6:
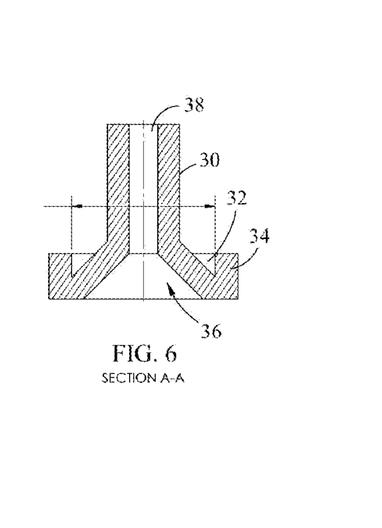
FIG. 6 is a side cross-sectional view of the insert of FIG. 3, taken along section lines A-A of FIG. 5.

FIG. 5 is a side view of an embodiment of the insert 22 marking section lines A-A. FIG. 6 is a cross-sectional view of the insert 22 taken from section lines A-A of FIG. 5. A channel 38 is defined through the hollow stem 30 and opens into the concave bottom surface 36. The channel 38 is in adjustable fluid communication with the ports 12 and 13 and the outlet 14. The channel 38 forms part of the path with which fluid introduced to the valved coupling 10 by one of the ports 12 or 13 will follow to reach the outlet 14.

Figure 7:
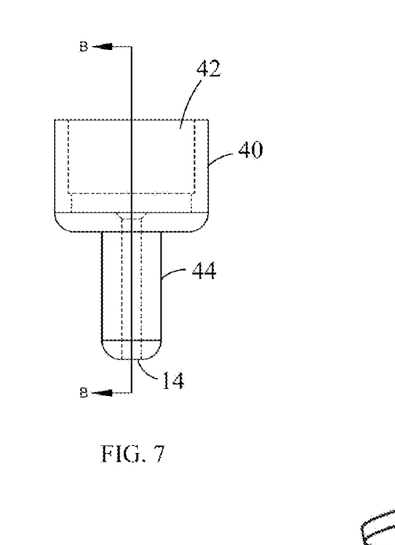
FIG. 7 is a side view of an embodiment of a cup removed from the valved coupling of FIG. 2.
Figure 8:
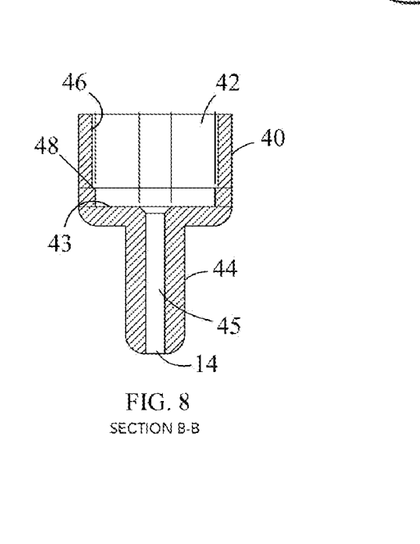
FIG. 8 is a side cross-sectional view of the cup of FIG. 7, taken along section lines B-B of FIG. 7.

FIG. 7 is a side view of an embodiment of the cup 16 according to the present invention. FIG. 8 is a side cross-sectional view of an embodiment of the cup 16 taken along section lines B-B of FIG. 7. The cup 16 includes an open-ended cup body 40 forming an internal cavity 42. The outlet 14 is preferably defined at the end of an extension 44 extending from the cup body 40. In some preferred embodiments, the extension 44 has a cylindrical shape. An outlet channel 45 is defined through the extension 44 to fluidically connect the internal cavity 42 with the outlet 14. Preferably, the outer diameter of the extension 44 is substantially equal to an inner diameter of a receiving aperture 102 formed in a drip head 100 to form a press-fit fluid seal. The length of the extension 44 is selected to ensure the fluid seal is maintained under the various water pressures that may be generated in the drip irrigation line.

The upper end 46 of the cup 16 is configured for press-fit engagement with the first annular step 21 extending from the main body 19. The inner diameter of the upper end 46 is therefore substantially equal to the outer diameter of the first annular step 21. When assembled, the upper end 46 may be sonically welded to the first annular step 21 to ensure a secured connection is maintained. In alternative embodiments, an adhesive or other type of sealant may be applied to the upper end 46 prior to the first annular step 21 being press-fit therein. Alternatively, various other welding techniques may be applied to ensure a secured connection is created between the T-body 18 and the cup 16.

A lower annular ledge 48 is formed about an inner wall of the internal cavity 42, proximate the closed bottom surface 43. The lower annular ledge 48 is configured to seat the flange 34 formed around the bowl 32 of the insert 22. The insert 22 is held in place on the lower annular ledge 48 by the second annular step 23 engaging an upper surface of the flange 34. The insert 22 is preferably "pinch-fit" within the internal cavity 42 of the cup 16 and held on the lower annular ledge 48 by the second annular step 23 limiting upward movement of the insert 22 when the valved coupling 10 is assembled.

Figure 9:
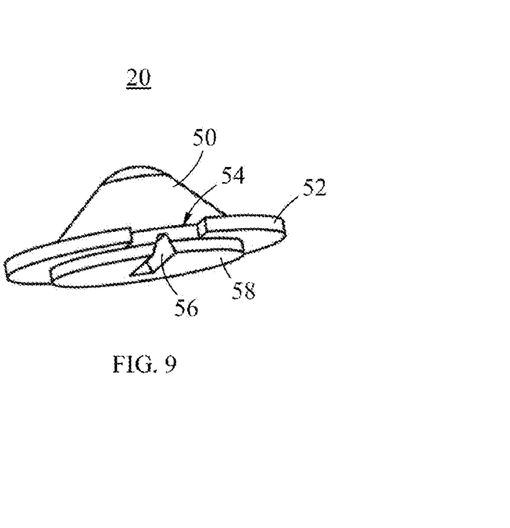
FIG. 9 is a side perspective view of an embodiment of a floating flow restrictor removed from the valved coupling of FIG. 2.

FIG. 9 is a perspective view of an embodiment of a floating flow restrictor 20 according to aspects of the present invention. The floating flow restrictor 20 is designed to be freely floating within the internal cavity 42 of the cup 16. Specifically, the floating flow restrictor 20 has a conical body 50 configured to substantially match the concavity of the bottom surface 36 of the insert 22. A flange 52 is formed about a lower end of the conical body 50 and has a notch 54 removed therefrom so that the flange 52 does not extend completely around the conical body 50 of the floating flow restrictor 20. A notched channel 56 is defined in the bottom surface 58 of the conical body 50. Preferably, the outer diameter of the flange 52 is less than the inner diameter proximate the bottom surface 43 of the internal cavity 42 defined by the lower annular ledge 48. Such a configuration allows the floating flow restrictor 20 to freely move within the cavity 66 formed below the lower bowl 32 when the insert 22 is enclosed within the cup 16, as explained in more detail below. Further, as the floating flow restrictor 20 is raised off the bottom surface 43, e.g., floating, additional flow channels open around the outer edges of the flange 52 and are in fluid communication with the outlet 14.

Figure 10:
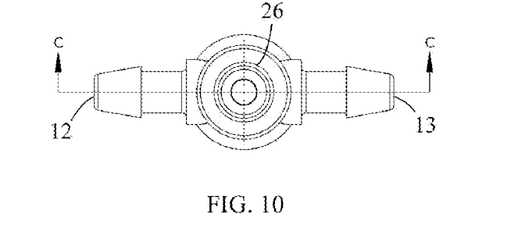
FIG. 10 is a top view of the valved coupling of FIG. 1.
Figure 11:
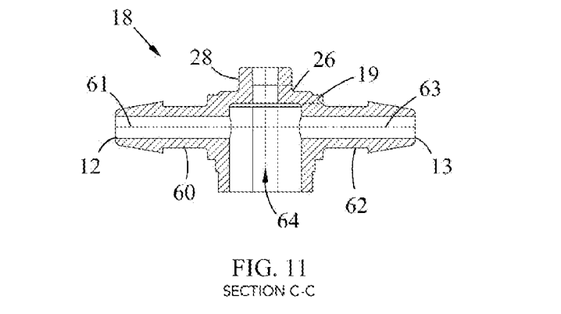
FIG. 11 is side cross-sectional view of a T-body removed from the valved coupling of FIG. 2, taken along section lines C-C of FIG. 10.

FIG. 10 is a top view of an embodiment of the valved coupling 10 marking section lines C-C and FIG. 11 is a cross-sectional view, taken along section lines C-C of FIG. 10, of an embodiment of the T-body 18, according to aspects of the present invention. Each of the first port 12 and the second port 13 are preferably formed at the terminal end of a first arm 60 and a second arm 62, respectively. Preferably, each of the first and second arms 60, 62 are configured as barbed arms, according to conventional designs for similar barbed couplings. Each of the first and second arms 60, 62 have internal flow channels 61, 63 that open into an internal cavity 64 defined within the main body 19 of the T-body 18. The set screw 24 extends through the upper surface 26 and into a portion of the internal flow cavity 64. When assembled, sufficient empty space remains in the internal flow cavity 64 around the set screw 24 and the insert 22 so that the port 12 remains in fluid communication with the port 13.

Figure 12:
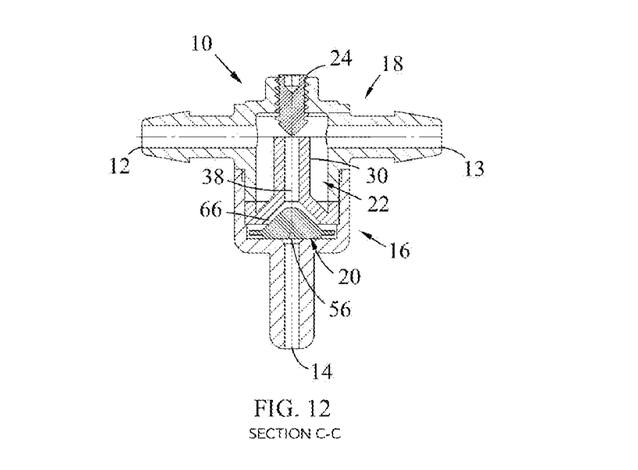
FIG. 12 is a side cross-sectional view of an embodiment of the valved coupling, taken along section lines C-C of FIG. 10.

FIG. 12 is a side cross-sectional view, taken along section lines C-C of FIG. 10, of an embodiment of a valved coupling 10 according to the present invention. The set screw 24 is designed to selectively contact the upper end of the hollow stem 30 to thereby open and close the channel 38 through the insert 22. When the channel 38 is closed, the set screw 24 has been adjusted to fully contact the hollow stem 30 and completely block or plug the channel 38. In such a position, fluid entering from one of the ports 12 or 13 will be able to freely flow through the internal cavity 64 around the deployed set screw 24 to be released from the other port 12 or 13. No fluid will reach the outlet 14 because the channel 38 connecting the outlet 14 to the ports 12, 13 has been plugged.

When the channel 38 is open, the set screw 24 has been adjusted or backed-off from the hollow stem 30 so that the channel 38 is unobstructed and fluid may freely flow therein. The fluid will continue down the channel 38 until it reaches the cavity 66, which is formed by the concave bottom surface 36 of the insert 22 being enclosed within the cavity 42 of the cup 16. The cavity 66 houses the floating flow restrictor 20 within the cup 16. Fluid passes over the floating flow restrictor substantially filling the cavity 66. Simultaneously, fluid can escape from the cavity 66 through the notched channel 56 formed in the bottom surface of the floating flow restrictor 20. As fluid begins to escape the cavity 66 through the notched channel 56, the floating flow restrictor 20 is lifted off the bottom surface 43 of the cup 16 so as to be floating within cavity 66. The fluid pressure within the cavity 66 will equalize, allowing the floating flow restrictor 20 to remain raised off the bottom surface 43 of the cup 16. While the floating flow restrictor 20 is floating in the cavity 66, fluid will continue to flow over the floating flow restrictor 20 and out of the notched channel 56 to be released from the outlet 14. Additional escape paths are formed between the outer edge of the flange 52 and inner wall of the annular ledge 48, allowing additional fluid to reach the outlet 14 by flowing over and around the floating flow restrictor 20. Thus, the outer diameter of the flange 52 is preferably less than the inner diameter proximate the bottom surface 43 defined by the lower ledge 48 to ensure fluid may escape from cavity 66 when the floating flow restrictor 20 has been lifted off the bottom surface 43 of the cup 16.

Figure 13:
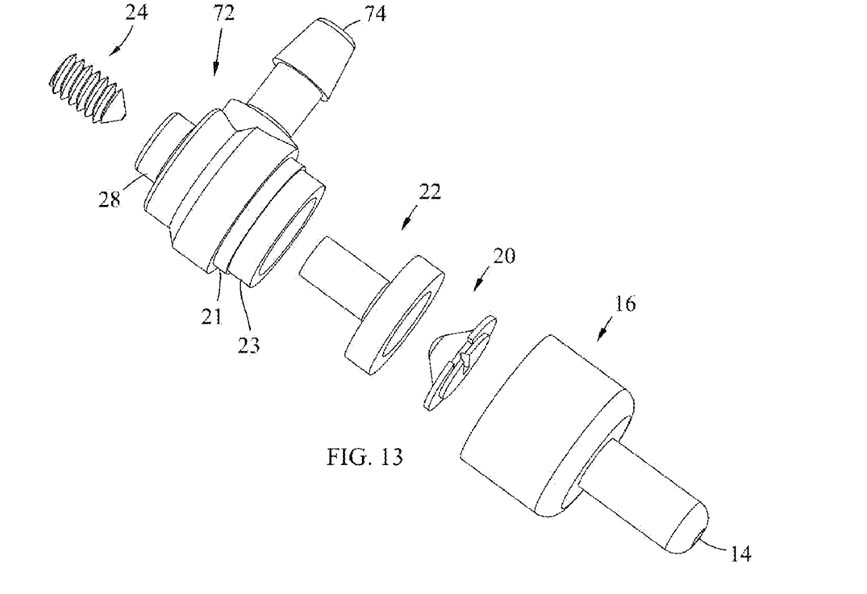
FIG. 13 is an exploded perspective view of an embodiment of a valved elbow coupling according to the present invention.

FIG. 13 is an exploded perspective view of an alternative embodiment of a valved elbow coupling 70 according to the present invention. The valved elbow coupling 70 includes many of the same components as the valved coupling 10. Specifically, the cup 16, the floating flow restrictor 20, the insert 22 and the set screw 24 are essentially the same in the valved elbow coupling 70 as they are in valved coupling 10. The main difference between the embodiments is the valved elbow coupling 70 includes an elbow body 72 having a single port 74, instead of a T-body 18 having two ports 12 and 13. Other features of the elbow body 72 are the same as those found in the T-body 18 described above. The elbow body 72 includes the first annular step 21 and second annular step 23 and can have a screw housing 28 formed on the top surface thereof.

The valved elbow coupling 70 may be particularly useful at the end of a drip irrigation line where no additional drip heads need connecting to the line. The single port 74 allows the valved elbow coupling 70 to form an end of the drip irrigation line while the flow restriction means contained within the coupling 70 allows the operator to selectively shutoff the fluid delivery to the outlet 14 of the valved elbow coupling 70.

Figure 14:
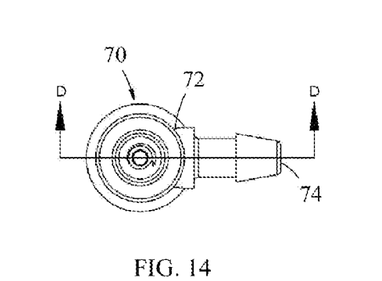
FIG. 14 is a top view of the valved elbow coupling of FIG. 13.
Figure 15:
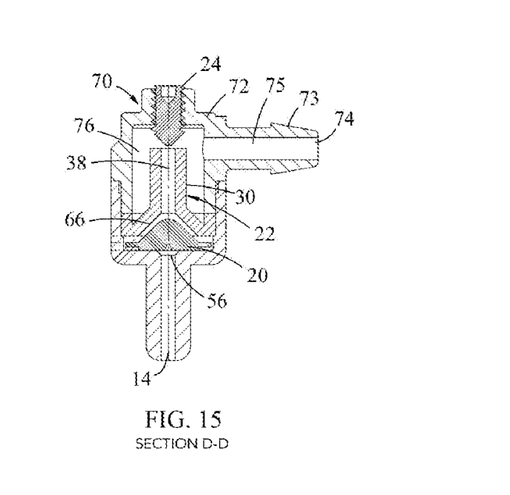
FIG. 15 is a side cross-sectional view of the valved elbow coupling of FIG. 13, taken along section lines D-D of FIG. 14.

FIG. 14 is a top view of an embodiment of the valved elbow coupling 70 marking section lines D-D and FIG. 15 is a cross-sectional view, taken along section lines D-D of FIG. 14, of an embodiment of the valved elbow coupling 70 according to the present invention. The port 74 may be similarly formed at the terminal end of a barbed arm 73 having an internal flow channel 75 opening into the internal flow cavity 76.

Operation of the valved elbow coupling 70 is similar to that described above with regard to the valved coupling 10. Primarily, the set screw 24 can selectively contact the upper end of the hollow stem 30 to thereby open and close the channel 38. When open, fluid may flow through the channel 38 and into cavity 66, which is similarly formed below the concave bottom surface 36 of the insert 22. The floating flow restrictor 20 is housed within the cavity 66, as described above, and as fluid flows over the flow restrictor, it will escape through the notched channel 56 defined in the bottom surface thereof to be released from the outlet 14. As additional fluid escapes through the notched channel 56, the floating flow restrictor 20 will be lifted off the bottom surface 43 of the cup 16 thereby opening additional escape paths between the flange and inner walls of the cup. The fluid pressure in the cavity 66 will equalize, allowing the floating flow restrictor 20 to float therein while the fluid is released from the outlet 14.

The primary difference between the valved elbow coupling 70 and the valved coupling 10 is that when the channel 38 is fully closed in the valved elbow coupling 70, fluid will return through the same port 74 it was introduced by. The valved elbow coupling 70 is therefore useful at the end of a drip irrigation line where no additional drip heads need to be connected.

Figure 16:
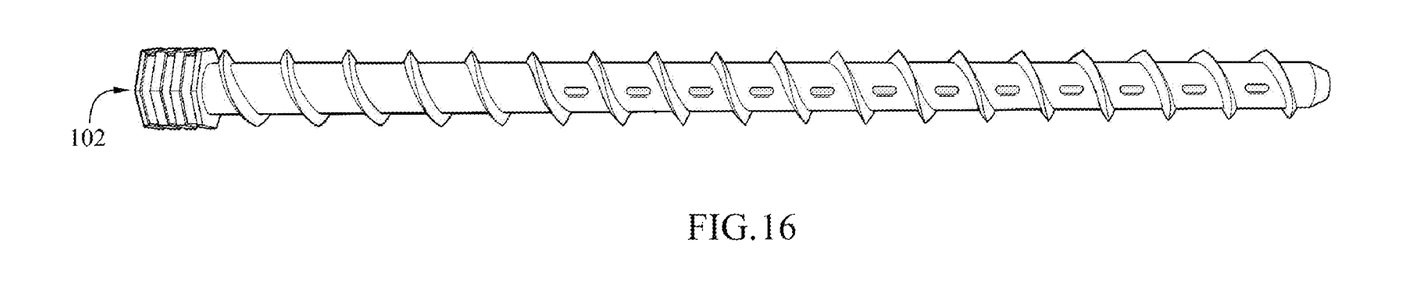
FIG. 16 is a side view of an example of a drip head that may be connected to a drip irrigation line using a valved coupling according to the present invention.
Figure 17:
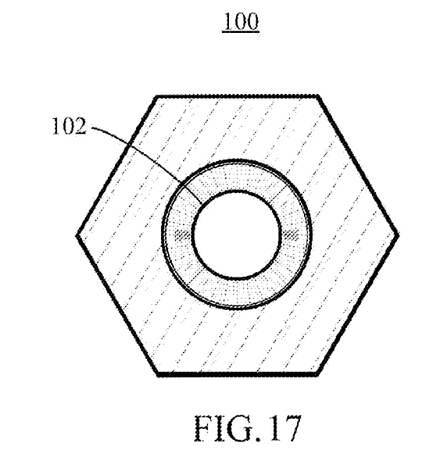
FIG. 17 is a top view of the drip head of FIG. 16.

FIG. 16 is a side view of an embodiment of a drip head or drip emitter 100 that may be fluidically connected to a drip irrigation line using a valved coupling 10 and 70 according to the present invention. FIG. 17 is a top view of an embodiment of the drip head 100 depicting the receiving aperture 102. In preferred embodiments of the valved coupling 10 and 70, the cylindrical extension 44 is configured for press-fit engagement with the receiving aperture 102 of the drip head 100.

The invention disclosed herein thus allows an operator to control the amount of water delivered to an individual drip head 100 without disrupting the flow of water to other drip heads deployed on the same drip line. The operator can select which of the drip heads 100 deployed along a common line will receive fluid by opening and/or closing the channel 38 of an individual valved couplings 10 or 70 without disrupting the flow of water to other drip heads on that line.

The following provides exemplary dimensions for certain preferred embodiments of the valved coupling 10 and valved elbow coupling 70. In some embodiments, the height from the top surface 26 of the body to the outlet end 14 may be about 1.135 inches. The outer diameter of the outlet end 14 is preferably about 0.185 inches. A preferred length of the cylindrical extension 44 of the outlet end 14 may be about 0.400 inches. The outer diameter of the outlet 14 is selected for press fit engagement with the receiving aperture 102 of a drip head 100. In one embodiment of the valved coupling 10, a horizontal distance between the first port 12 and the second port 13 may be about 1.250 inches. Similarly, in one embodiment of the valved elbow coupling 70, a horizontal distance between an outer edge of the body 72 to the port 74 may be about 0.90 inches. The inner diameter of the outlet 14 is preferably about 0.060 inches whereas the inner diameter of the port 12, 13, and 74 is preferably about 0.093 inches.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:
1. A valved coupling for a drip irrigation line, comprising:
   a body having an upper end, a main port, and an open lower end;
   a cup configured to engage the open lower end of the body, the cup having an outlet; and
   a means for restricting flow from the main port to the outlet comprising an insert, a flow restrictor, and a set screw, the insert enclosed within the cup to define a cavity, the flow restrictor freely floating within the cavity, and the set screw configured to contact an upper end of the insert.

2. The valved coupling of claim 1, wherein the body further comprises a second port.

3. The valved coupling of claim 2, the main port and the second port each comprise a barbed arm configured to engage a drip irrigation line.

4. The valved coupling of claim 1, further comprising an extension extending from a bottom surface of the cup and defining the outlet.

5. The valved coupling of claim 4, wherein the extension has an outer diameter less than an outer diameter of the cup.

6. The valved coupling of claim 4, wherein the extension is configured to frictionally engage a receiving aperture of a drip emitter.

7. The valved coupling of claim 1, wherein the body is partially enclosed within the cup.

8. The valved coupling of claim 7, wherein a portion of the body is welded to a portion of the cup.

9. The valved coupling of claim 1, wherein the insert comprises a hollow stem and a concave bowl forming the cavity there beneath, wherein a channel is defined through the hollow stem and opens into the cavity.

10. The valved coupling of claim 9, wherein the floating flow restrictor is configured to freely move within the cavity.

11. The valved coupling of claim 9, wherein the floating flow restrictor comprises a conical body having a top end, a bottom end, and an annular flange extending partially around the lower end and having a notched portion, wherein a notched channel is formed in a bottom surface of the lower end and is aligned with the notched portion of the annular flange.

12. The valved coupling of claim 11, wherein the notched channel fluidically connects the main port with the outlet when the flow restriction means is open.

13. The valved coupling of claim 11, wherein the floating flow restrictor is configured to float above the outlet in response to fluid entering the cavity and thereby opening additional flow paths to the outlet.

14. The valved coupling of claim 11, wherein the set screw is adjustable between an open position and a closed position, wherein when the set screw is in the open position, the set screw does not contact the hollow stem allowing the channel to conduct flow into the cavity, and wherein when the set screw is in the closed position, the set screw plugs the channel thereby closing off fluid flow to the cavity.

15. The valved coupling of claim 1, wherein the cup further comprises a ledge formed about an inner wall of the cup, the ledge configured to engage the insert.

16. The valved coupling of claim 15, wherein the body further comprises a first step and a second step extending from the first step, the first step configured to frictionally engage an inner surface of the cup.

17. The valved coupling of claim 16, wherein the insert is secured in place between the ledge of the cup and the second step of the body.

18. The valved coupling of claim 1, wherein the body further comprises a second port in fluid communication with the main port, wherein an internal cavity defined within the body maintains fluid communication between the main port and the second port.

19. The valved coupling of claim 18, wherein the fluid communication between the main port and the second port is maintained regardless of whether the outlet is fluidically connected to the main port or the second port.

\* \* \* \* \*